US006803742B1

(12) United States Patent
Visciano

(10) Patent No.: US 6,803,742 B1
(45) Date of Patent: Oct. 12, 2004

(54) SOLAR RECHARGEABLE BATTERY

(76) Inventor: Joseph Visciano, 523 Park Ave., Centereach, NY (US) 11720

( * ) Notice: Subject to any disclaimer, the term of this patent is extended or adjusted under 35 U.S.C. 154(b) by 0 days.

(21) Appl. No.: 10/284,524

(22) Filed: Oct. 30, 2002

(51) Int. Cl.[7] .................................................. H02J 7/00
(52) U.S. Cl. ....................................... 320/101; 320/107
(58) Field of Search ................................. 320/101, 107, 320/108, 109; 136/243, 244, 245; 429/61, 90, 96, 97, 98, 99, 100

(56) References Cited

U.S. PATENT DOCUMENTS

| | | | |
|---|---|---|---|
| 4,240,021 A | | 12/1980 | Kashima et al. ................ 320/2 |
| 4,563,727 A | * | 1/1986 | Curiel .......................... 362/183 |
| 4,842,965 A | * | 6/1989 | Urushiwara et al. ........... 429/56 |
| 5,751,133 A | | 5/1998 | Sato et al. ...................... 320/13 |
| 6,346,670 B1 | | 2/2002 | Fujii et al. ................... 136/293 |

FOREIGN PATENT DOCUMENTS

JP            55035350 A   *   3/1980   ............ G02B/7/26

* cited by examiner

Primary Examiner—Michael Sherry
Assistant Examiner—Lawrence Luk
(74) Attorney, Agent, or Firm—Richard L. Miller

(57) ABSTRACT

A solar rechargeable battery. A storage battery is contained in a case, on which is disposed a solar cell that electrically communicates with, and charges, the storage battery. In two embodiments, the case is cylindrically-shaped. In one of which, the solar cell forms a longitudinal segment of the case so as to maintain the cylindrical shape of the case, and has a V-grooved block that receives and holds the case in a supine position. In the other of which, the solar cell is on one end wall of the case surrounding the positive contact. In a third embodiment, the case is rectangular-shaped and the solar cell forms a longitudinal segment of the case so as to maintain the rectangular shape of the case, and the positive and negative contacts are on the same end wall of the case.

5 Claims, 1 Drawing Sheet

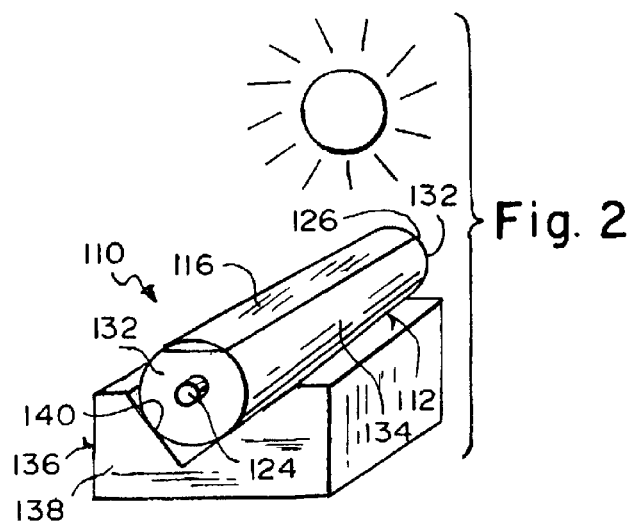
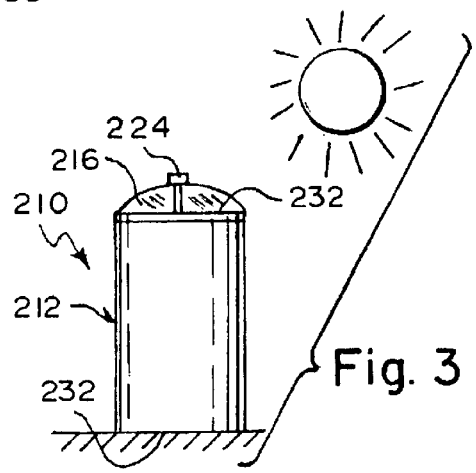
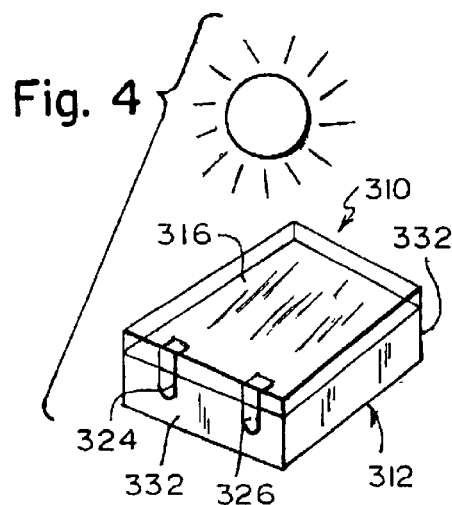
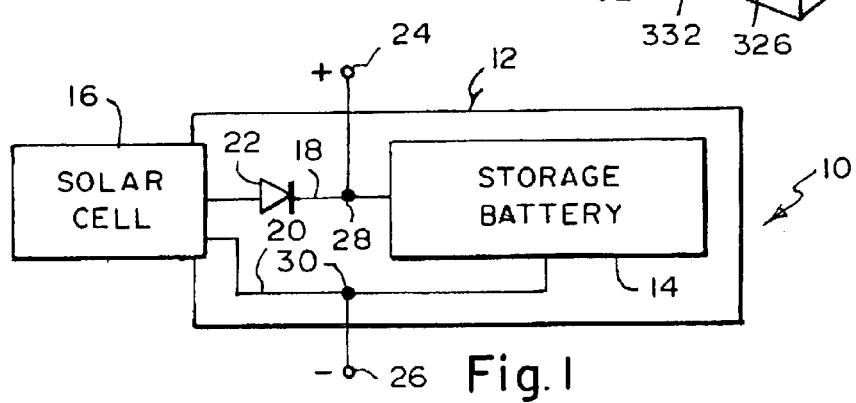

SOLAR RECHARGEABLE BATTERY

BACKGROUND OF THE INVENTION

1. Field of the Invention

The present invention relates to a rechargeable battery. More particularly, the present invention relates to a solar rechargeable battery.

2. Description of the Prior Art

Numerous innovations for battery related systems have been provided in the prior art that will be described. Even though these innovations may be suitable for the specific individual purposes to which they address, however, they differ from the present invention.

A First Example, U.S. Pat. No. 4,240,021 to Kashima et al. teaches a solar cell battery charging control system having a storage battery and a plurality of solar cells connected in series for charging the storage battery, which system comprises a heavy load means adapted to be driven by the storage battery to discharge the storage battery for thereby preventing overcharging of the storage battery when a battery charge level exceeds a predetermined value.

A Second Example, U.S. Pat. No. 5,751,133 to Sato et al. teaches a charge/discharge control system for charging the output of a storage battery from a solar cell, the output voltage of the storage battery connected to a node between the solar cell output and a load is detected. If the detected voltage is less than a first setting value, discharge from the storage battery to the load is inhibited. The discharge inhibition is released in response to a discharge inhibition release command after the storage battery voltage increases to a second setting value.

Third Example, U.S. Pat. No. 6,346,670 B1 to Fujii et al. teaches a reliable, long lasting solar battery system capable of collecting and storing long-term data on charge and discharge. The system includes a solar battery having a charge control means, and a storage battery, wherein the charging volume of the storage battery is detected by a charge quantity detecting means. Further, a discharge quantity of the storage battery is detected by a discharge quantity. The detected a analog signal is sent through an external interface means to an operation and decision means. An operation and decision means controls a discharge quantity control device, wherein the detected signal, as well as other signals, are processed, together with appropriate various command signals sent by a storage means in accordance with a load or loads, and are outputted to a discharge control means. Further, data on present and past command signals, including the result of past control, are stored in order of time into the storage means. A control signal for controlling the output discharge quantity controls the discharge output means in accordance with the charge quantity of the discharge control means, and the discharge output means supplies the needed electric power to a load.

It is apparent that numerous innovations for battery related systems have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

Accordingly, an Object of the present invention is to provide a solar rechargeable battery that avoids the disadvantages of the prior art.

Another Object of the present invention is to provide a solar rechargeable battery that is simple and inexpensive to manufacture.

Still Another Object of the present invention is to provide a solar rechargeable battery that is simple to use.

Briefly Stated, Still Yet Another Object of the present invention is to provide a solar rechargeable battery. A storage battery is contained in a case, on which is disposed a solar cell that electrically communicates with, and charges, the storage battery. In two embodiments, the case is cylindrically-shaped. In one of which, the solar cell forms a longitudinal segment of the case so as to maintain the cylindrical shape of the case, and has a V-grooved block that receives and holds the case in a supine position. In the other of which, the solar cell is on one end wall of the case surrounding the positive contact. In a third embodiment, the case is rectangular-shaped and the solar cell forms a longitudinal segment of the case so as to maintain the rectangular shape of the case, and the positive and negative contacts are on the same end wall of the case.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a block diagram of the present invention;

FIG. 2 is a diagrammatic perspective view of a first embodiment of the present invention shown in FIG. 1;

FIG. 3 is a diagrammatic perspective view of a second embodiment of the present invention shown in FIG. 1; and FIG. 4 is a diagrammatic perspective view of a third embodiment of the present invention shown in FIG. 1.

LIST OF REFERENCE NUMERALS UTILIZED IN THE DRAWING

General

10 solar rechargeable battery of present invention
12 case
14 storage battery
16 solar cell for charging storage battery 14 when exposed to light
18 positive wire
20 negative wire
22 diode for preventing storage battery 14 from discharging back to solar cell 16
24 positive contact
26 negative contact
28 internal positive terminal
30 internal negative terminal

First Embodiment

110 solar rechargeable battery
112 case
116 solar cell
124 positive contact
126 negative contact 132 pair of end walls of case 112
134 longitudinal surface of case 112
136 base
138 block of base 136
140 V-groove in block 138 of base 136

Second Embodiment 210 solar rechargeable battery
212 case
216 solar cell
224 positive contact
232 pair of end walls of case 212

Third Embodiment 310 solar rechargeable battery
312 case
324 positive contact
326 negative contact
332 pair of end walls of case 312

DETAILED DESCRIPTION OF THE PREFERRED EMBODIMENT

Referring now to the figures, in which like numerals indicate like parts, and particularly to FIG. 1, the general configuration of the solar rechargeable battery of the present invention is shown generally at 10.

The solar rechargeable battery 10 comprises a case 12, a storage battery 14, and a solar cell 16. The storage battery 14 is contained in the case 12. The solar cell 16 is disposed on the case 14, is in electrical communication with the storage battery 14, and is for charging the storage battery 14 when exposed to light.

The solar cell 16 is in electrical communication with the storage battery 14 via a positive wire 18 and a negative wire 20. The positive wire 18 and the negative wire 20 are contained in the case 12.

The positive wire 16 has a diode 22 in series therein. The diode 22 is for preventing the storage battery 14 from discharging back to the solar cell 16.

The solar rechargeable battery 10 further comprises a positive contact 24 and a negative contact 26. The positive contact 24 extends from the case 12 and is in electrical communication with the positive wire 18 via an internal positive terminal 28. The negative contact 26 extends from the case 12 and is in electrical communication with the negative wire 20 via an internal negative terminal 30.

The specific configuration of a first embodiment of the solar rechargeable battery 110 can best be seen in FIG. 2, and as such, will be discussed with reference thereto.

The case 112 is cylindrically-shaped and has a pair of end walls 132 and a longitudinal surface 134 that extends between the pair of end walls 132 thereof.

The positive contact 124 extends coaxially from one end wall 132 of the case 112 and the negative contact 126 forms the other end wall 132 of the case 112.

The solar cell 116 forms a longitudinal segment of the case 112 and extends completely along the longitudinal surface 134 thereof and maintains the cylindrical shape of the case 112.

The solar rechargeable battery 110 further comprises a base 136. The base 136 is a block 138. The block has a V-groove 140 therein that receives and holds the case 112 in a supine position so as to allow the solar cell 116 to be visible to the light during charging without having to be manually held on its side.

The specific configuration of a second embodiment of the solar rechargeable battery 210 can best be seen in FIG. 3, and as such, will be discussed with reference thereto.

The solar rechargeable battery 210 is similar to the solar rechargeable battery 110, except that the solar cell 216 is on the one end wall 232 of the case 212 surrounding the positive contact 224 so as to allow the solar cell 216 to be visible to the light during charging by standing up on the other end wall 232 of the case 212.

The specific configuration of a third embodiment of the solar rechargeable battery 310 can best be seen in FIG. 4, and as such, will be discussed with reference thereto.

The solar rechargeable battery 310 is similar to the solar rechargeable battery 110, except that:
1. The case 312 is rectangular-shaped.
2. The negative contact 326 extends from the one end wall 332 that the positive contact 324 extends from.

It will be understood that each of the elements described above, or two or more together, may also find a useful application in other types of constructions differing from the types described above.

While the invention has been illustrated and described as embodied in a solar rechargeable battery, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

What is claimed is:
1. A solar rechargeable battery, comprising:
a) a case;
b) a storage battery;
c) a solar cell;
d) positive contact; and
e) a negative contact;
wherein said storage battery is contained in said case;
wherein said solar cell is disposed on said case;
wherein said solar cell is in electrical communication with said storage battery;
wherein said solar cell is for charging said storage battery when exposed to light;
wherein said solar cell is in electrical communication with said storage battery via a positive wire;
wherein said solar cell is in electrical communication with said storage battery via a negative wire;
wherein said positive wire is contained in said case;
wherein said negative wire is contained in said case;
wherein said positive contact extends from said case;
wherein said positive contact is in electrical communication with said positive wire via an internal positive terminal;
wherein said negative contact extends from said case;
wherein said negative contact is in electrical communication with said negative wire via an internal negative terminal;
wherein said case has a pair of end walls;
wherein said case has a longitudinal surface;

wherein said longitudinal surface of said case extends between said pair of end walls thereof;

wherein said positive contact extends coaxially from one end wall of said case;

wherein said negative contact extends from the other end wall of said case;

wherein said case is cylindrically-shaped; and wherein said solar cell is on said one end wall of said case surrounding said positive contact so as to allow said solar cell to be visible to light during charging by standing up on the other end wall of said case.

2. The battery as defined in claim 1, wherein said solar cell is in electrical communication with said storage battery via a positive wire;

wherein said solar cell is in electrical communication with said storage battery via a negative wire;

wherein said positive wire is contained in said case; and wherein said negative wire is contained in said case.

3. The battery as defined in claim 2, wherein said positive wire has a diode in series therein; and wherein said diode is for preventing said storage battery from discharging back to said solar cell.

4. The battery as defined in claim 2; further comprising a positive contact and a negative contact;

wherein said positive contact extends from said case;

wherein said positive contact is in electrical communication with said positive wire via an internal positive terminal;

wherein said negative contact extends from said case; and wherein said negative contact is in electrical communication with said negative wire via an internal negative terminal.

5. The battery as defined in claim 1, wherein said positive contact extends coaxially from one end wall of said case; and wherein said negative contact extends from the other end wall of said case.

* * * * *